United States Patent [19]
Mangin et al.

[11] Patent Number: 5,905,870
[45] Date of Patent: May 18, 1999

[54] ARRANGEMENT FOR INITIATING AND MAINTAINING FLOW CONTROL IN SHARED-MEDIUM, FULL-DUPLEX, AND SWITCHED NETWORKS

[75] Inventors: Jim Mangin, San Ramon; Shashank Merchant; Mohan Kalkunte, both of Sunnyvale, all of Calif.

[73] Assignee: Advanced Micro Devices, Inc, Sunnyvale, Calif.

[21] Appl. No.: 08/709,889

[22] Filed: Sep. 11, 1996

[51] Int. Cl.$^6$ .............................. G06F 3/00; G06F 13/00
[52] U.S. Cl. ................................ 395/200.64; 395/200.43
[58] Field of Search ........................ 395/200.64, 200.43, 395/116, 872

[56] References Cited

U.S. PATENT DOCUMENTS 5,469,545  11/1995  Vanbuskirk et al. ............... 395/200.64

FOREIGN PATENT DOCUMENTS 0425202  5/1991  European Pat. Off. .
0648034  4/1995  European Pat. Off. .
96/13957  5/1996  WIPO .

OTHER PUBLICATIONS

Lee Melatti, "Fast Ethernet: 100 Mbit/s Made Easy", Data Communications, vol. 23, No. 16, Nov. 1, 1994, pp. 111, 112, 114, 116.

AMD, Am79C971 PCnet™–FAST Single–Chip Full–Duplex 10/100 Mbps Ethernet Controller for PCI Local Bus, Preliminary Data Sheet Publication #20550, Rev. B, May 1996.

"IEEE 802.3x Full Duplex Operation and Flow Control," Rich Seifert, IEEE 802 Plenary, La Jolla, CA, Mar. 1996.

Breyer et al., "Switched and Fast Ethernet: How It Works and How to Use It", Ziff–Davis Press, Emeryville, California (1995), pp. 60–70.

Johnson, "Fast Ethernet: Dawn of a New Network," Prentice–Hall, Inc. (1996), pp. 158–175.

*Primary Examiner*—Ellis B. Ramirez
*Assistant Examiner*—Mark E. Gaski

[57] ABSTRACT

Flow control signals in half-duplex and full-duplex networks are initiated and maintained based on the detected number of data bytes stored in a receive buffer from payload data of received data packets. If the number of stored data bytes exceeds a predetermined threshold, the network interface initiates flow control. Alternatively, the decision to initiate flow control may be based upon the rate at which the receive buffer is emptied compared to the number of stored data bytes in the receive buffer, or the rate the data bytes are stored into the receive buffer. The duration of the flow control is calculated as a wait time interval selected in response to the number of stored data bytes. The wait time may be selectively set as an integer multiple of slot times, or as a time interval based on the number of stored data bytes relative to the removal rate. Hence, the precise control and the initiation of the flow control for a specific wait time prevents loss of transmitted data while maintaining network throughput.

28 Claims, 9 Drawing Sheets

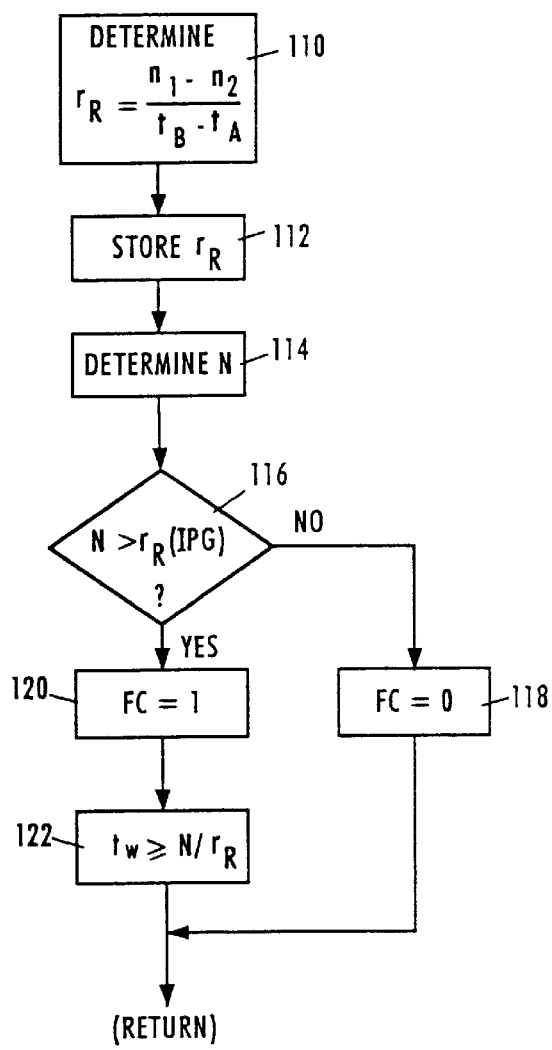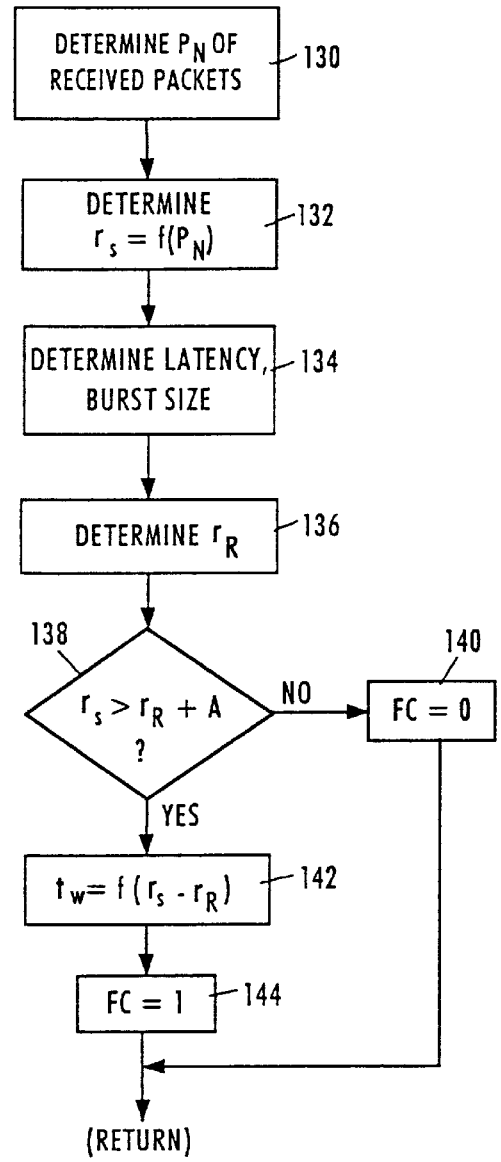
Figure 5B
Figure 5C

ARRANGEMENT FOR INITIATING AND MAINTAINING FLOW CONTROL IN SHARED-MEDIUM, FULL-DUPLEX, AND SWITCHED NETWORKS

TECHNICAL FIELD

The present invention relates to network interfacing and more particularly, to methods and systems controlling network data traffic on media of half-duplex and full-duplex networks.

BACKGROUND ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Traffic is not distinguished or prioritized over the medium. Each station includes an Ethernet interface card that uses carrier-sense multiple-access with collision detection (CSMA/CD) to listen for traffic on the media. The absence of network traffic is detected by sensing a deassertion of a receive carrier on the media.

Any station having data to send will attempt to access the channel by waiting a predetermined time after the deassertion of a receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision. Hence, a transmitting station will monitor the media to determine if there has been a collision due to another station sending data at the same time. If a collision is detected, both stations stop, wait a random amount of time, and retry transmission.

Network stations generally do not have knowledge of the status of other stations on the network. If there is no collision, a transmitting station will transmit the data packet regardless of the state of the receiving station. If the receiving station is in a state of congestion, for example due to a lack of buffer space, the receiving station will discard the transmitted packet, resulting in a loss of data. If upper layer protocol requires the data to be resent, the sending station will resend the data packet, reducing the network throughput.

A full duplex environment has been proposed for Ethernet networks, referred to as IEEE 802.3x, Full Duplex with Flow Control-Working Draft (0.3). The full duplex environment provides a two-way, point-to-point communication link between two network elements, for example a network station and a switched hub. Hence, two or more stations can simultaneously transmit and receive Ethernet data packets between each other via a switched hub without collisions.

Network congestion occurs if a receiving network element is unable to receive data at a rate greater than or equal to the transmission rate of the transmitting element. For example, traffic in a client-server environment is dominated by client requests followed by a burst of frames from the server to the requesting client. Although the full duplex environment enables the server to transmit packets while receiving requests from other clients, only a limited number of client requests can be output to the server from the switched hub at the assigned switching port. If the number of client requests exceeds the capacity of the server's port, some of the data packets will be lost. Alternatively, a client having limited buffer space may be unable to keep up with the transmission rate of the server, resulting in lost packets.

Flow control has been proposed to reduce network congestion, where a sending station temporarily suspends transmission of data packets. A proposed flow control arrangement for a full duplex environment, referred to as IEEE 802.3x[2], specifies generation of a flow control message, for example a PAUSE frame. A transmitting station that receives the PAUSE frame enters a pause state in which no frames are sent on the network for a time interval specified in the PAUSE frame.

Another proposed flow control arrangement for a half duplex environment, referred to as "backpressure", causes a receiving station to force a collision with the transmitting station when the receive buffer of the receiving station reaches a "receive buffer unavailable" state.

The disclosed flow control proposals, however, assume that flow control should be initiated when a receive buffer is full, which still results in a loss of data. Moreover, the existing proposals do not describe how to determine the duration of the flow control. If the flow control duration is too short, a receiving station may still lose portions of the transmitted data. If the duration is too long, the transmitting station remains idle, reducing network throughput.

DISCLOSURE OF THE INVENTION

There is a need for an arrangement that automatically initiates flow control to control network traffic without any loss of data.

There is also a need for an arrangement that determines when to initiate flow control by a network element.

There is also a need for an arrangement that determines the duration of flow control.

These and other objects are attained by the present invention, where the determination to initiate flow control is based on the number of data bytes stored in a receive buffer.

According to one aspect of the present invention, a method for controlling transmission of data packets to a network element, via a network having a shared medium, includes the steps of storing into a receive buffer data bytes received from the shared medium by the network element, monitoring a number of the stored data bytes in the receive buffer, and outputting from the network element onto the shared medium a flow control signal corresponding to a wait time selected in response to the number of stored data bytes. The number of stored data bytes are monitored to initiate flow control before the receive buffer is full, ensuring minimal loss of data. In addition, the wait time defining the flow control interval is selected in accordance with the number of stored data bytes, ensuring the flow control interval minimizes the loss of data while maintaining network throughput.

Another aspect of the present invention provides a network element receiving data packets from a network medium, the network element comprising a receive buffer for storing data bytes from the data packets received from the network medium, a buffer monitor determining a number of the stored data bytes in the receive buffer, and a controller initiating a wait time interval corresponding to the number of stored data bytes, the controller selectively outputting onto the network medium a flow control signal during the wait time interval to prevent overflow of the receive buffer.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein:

FIGS. 5A, 5B and 5C are flow diagrams illustrating alternative methods for initiating flow control for selected time intervals.

BEST MODE FOR CARRYING OUT THE INVENTION

Figure 1A:
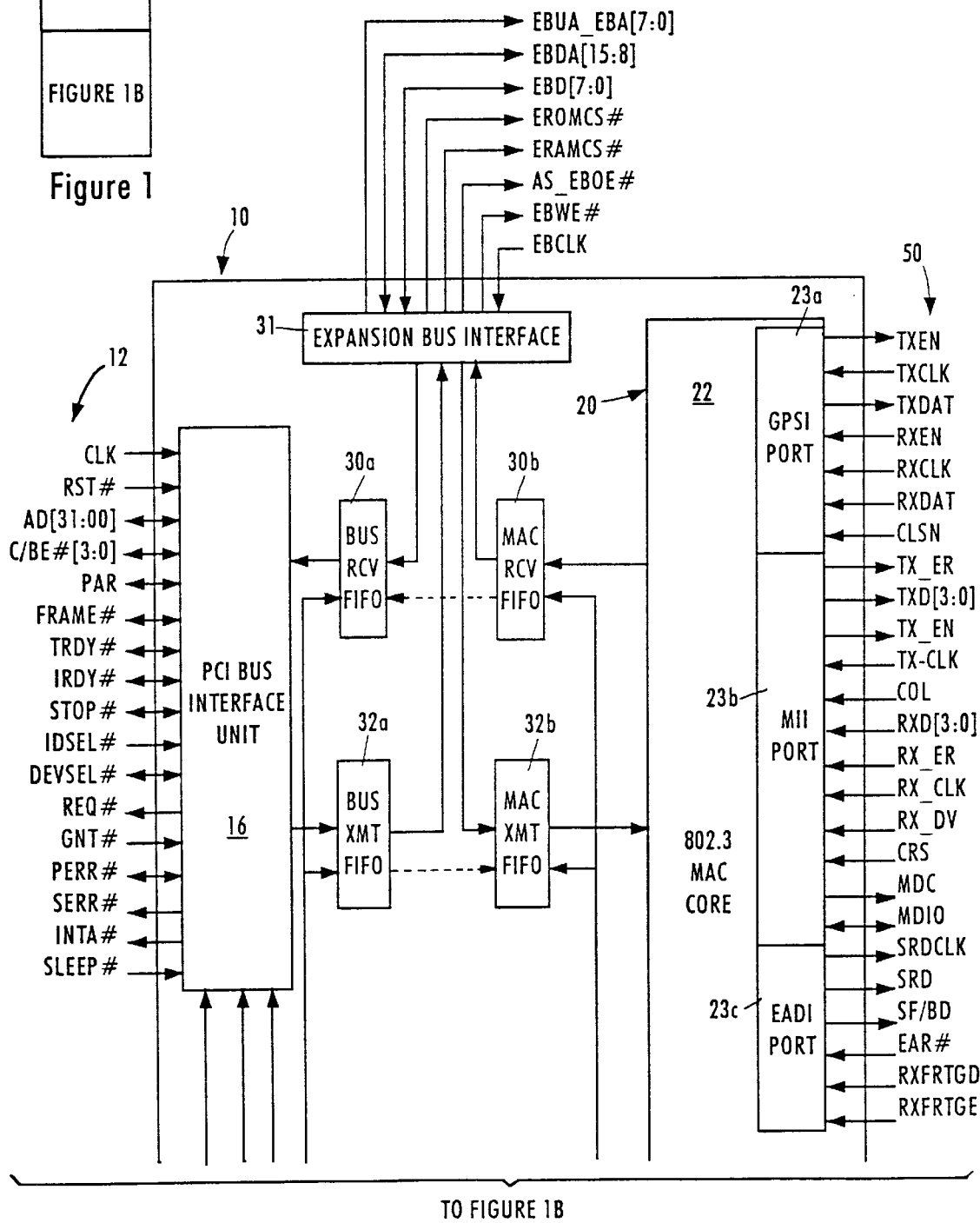
FIG. 1 is a block diagram of a network interface according to an embodiment of the present invention.

FIG. 1 is a block diagram of an exemplary network interface 10 of a network station that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the Am79C971 PCnet™-FAST Single-Chip Full-Duplex Ethernet Controller for PCI Local Bus, disclosed in Preliminary Data Sheet Publication #20550, Rev. B, Issue Date May, 1996, from Advanced Micro Devices, Inc., Sunnyvale, Calif., the disclosure of which is incorporated in its entirety by reference.

The interface 10 includes a PCI bus interface unit 16, a direct memory access (DMA) buffer management unit 18, and a network interface portion 20. The network interface portion 20 selectively operates in either half-duplex mode or full-duplex mode according to IEEE 802.3x[2]. The network interface portion 20 includes a media access control (MAC) core 22, a General Purpose Serial Interface (GPSI) 23a, a Media Independent Interface (MII) 23b for connecting external 10 MBit/s or 100 MBit/s transceivers, an External Address Detection Interface (EADI) 23c, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes an EEPROM interface 28, an LED control 29, and an expansion bus interface 31 for boot RAM (e.g., EPROM or Flash memory) during startup, and an IEEE 1149.1-compliant JTAG Boundary Scan test access port interface 36. Full-duplex operation can be performed by any of the AUI, GPSI, 10BASE-T and MII interfaces. Additional details of these interfaces are disclosed in the above-referenced Am79C971 Preliminary Data Sheet.

The network interface 10 also includes a PCI bus receive first in first out (FIFO) buffer 30a, a MAC receive FIFO buffer 30b, a PCI bus transmit FIFO buffer 32a, a MAC transmit FIFO buffer 32b, and a FIFO controller 34. As shown in FIG. 1, the MAC receive FIFO buffer 30b effectively passes stored data bytes to the PCI bus receive FIFO buffer 30a when the expansion bus interface 31 is not in use.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the PCI bus transmit FIFO buffer 32a, and subsequently to the MAC transmit FIFO buffer 32b.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 and the MAU 26 each include a physical layer that senses idle to non-idle transitions on the media 50, as specified in Ethernet (ANSI/IEEE 802.3) protocol. The detection of activity on the media 50 is performed by the physical layer, which asserts a valid receive data indication to the MAC 20 layer in response to the detection and decoding of the preamble of a received data packet. Hence, the term activity on the media refers to reception of valid data. The sensed deassertion of the receive carrier occurs when the physical layer determines that the media 50 transitions from a nonidle to an idle state. The AUI 24 detects a collision by the CI inputs, and the MAU 26 detects a collision by sensing activity on both twisted pair signals RXD and TXD.

As described below, data packets received from the media 50 are processed by the MAC 22 to recover the payload data carried by the data packets. Once the MAC 22 recovers the payload data of the data packets, the MAC 22 stores the data bytes of the payload data into the MAC receive FIFO buffer 30b under the control of the FIFO control 34. The data bytes stored in the MAC receive FIFO buffer 30b are passed to the PCI bus receive FIFO buffer 30a and then the PCI bus interface unit based on the bus latency and burst size for the PCI bus 12. The network interface 10 includes a MAC pause controller 38, and wait time registers/counters 40 that identify thresholds for initiating flow control commands (i.e., PAUSE commands) by the MAC 22 and/or the FIFO controller 34. The MAC pause controller 38 monitors the input storage rate for data bytes received by the MAC 22 into the MAC receive FIFO buffer 30b based on write messages supplied to the MAC Pause Controller 38 from the MAC 22. The MAC pause controller 38 also monitors the rate of data output from the MAC receive FIFO buffer 30b based on read messages, bus latency information, and burst size information from the PCI Bus Interface Unit 16.

The MAC Pause Controller 38 determines whether to initiate a flow control mode based on the number of data bytes stored in the receive buffer. The MAC Pause Controller 38 also determines the duration of the flow control, referred to as the wait time, and includes internal counters to monitor the duration of the wait time.

Figure 1B:
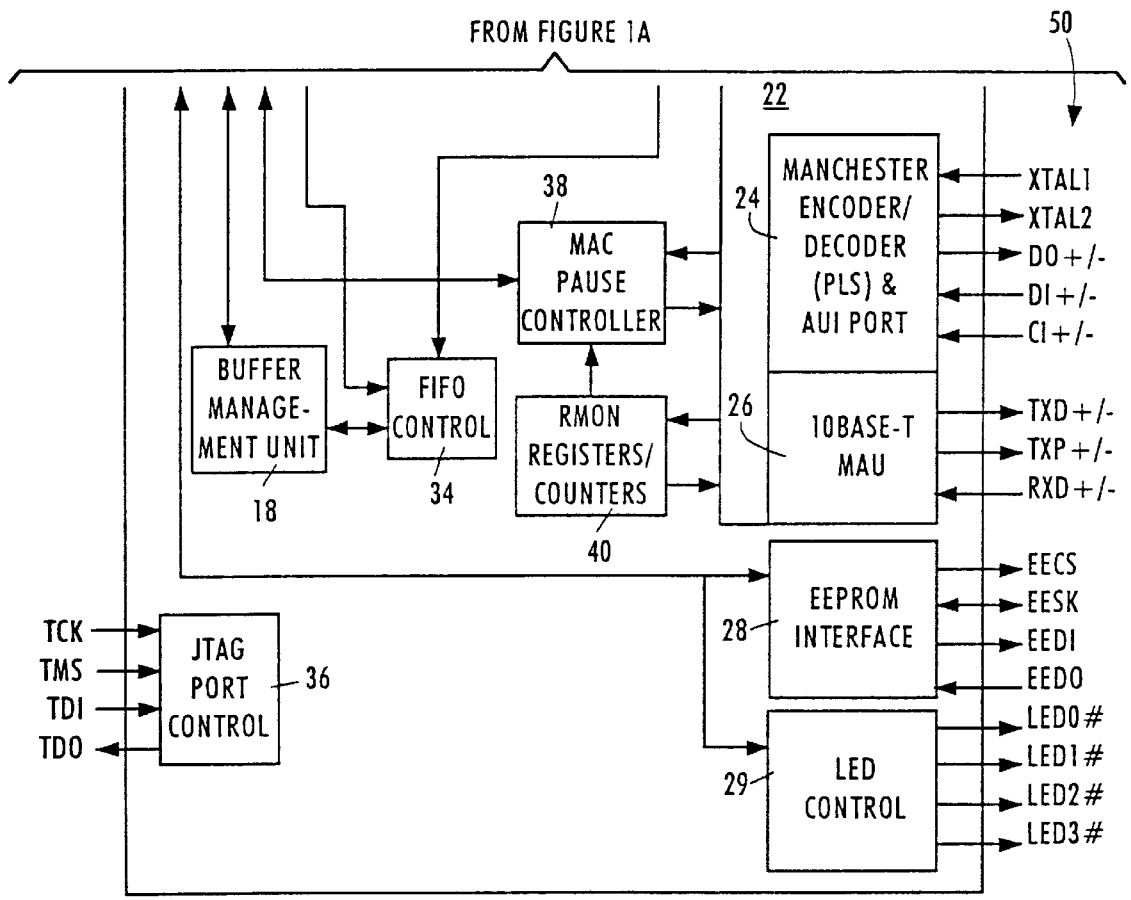
Figure 2:
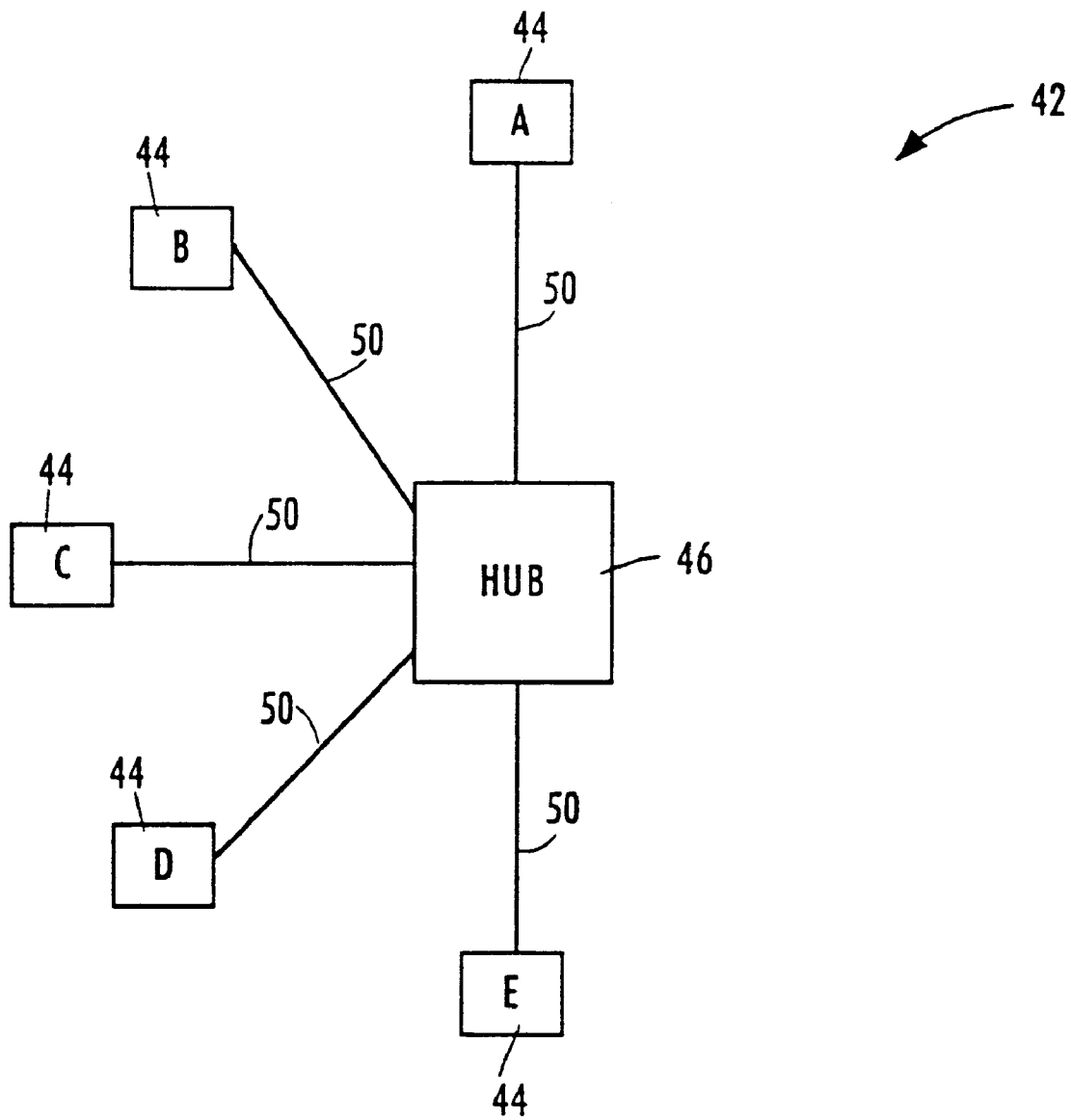
FIG. 2 is a diagram illustrating a network configuration of stations having the network interface of FIG. 1.

FIG. 2 is a diagram illustrating a network 42 having network elements 44 and 46 connected by a network media 50. The term network element refers generically to the network stations 44 and the hub 46. Each of the network stations 44 include the network interface 10 of FIG. 1. The network element 46 is a switched hub that includes a MAC controller and an internal data buffer storing data packets as data bytes before transmission to a network station 44. The media 50 may be either fiber optic, twisted pair wire, or coaxial, and hence may couple the interface 10 of each corresponding station 44 to 10BASE-T, 10BASE-2, 100BASE-TX, 100BASE-T4, or 100BASE-FX networks. The network 42 may operate at 10 megabits per second (10 Mbit/s), 100 megabits per second (100 Mbit/s), or 1000 megabits per second (1000 Mbit/s).

As shown in FIG. 2, the media 50 are connected to a hub 46. In half-duplex networks, the hub 46 is implemented as a repeater capable of performing auto-negotiation with the respective network stations 44, including a link start-up procedure each time a link to a station 44 is connected, powered on or reset. During auto-negotiation, the hub 46 automatically configures each station 44 for operating according to the network configuration parameters, for example, network topology, signaling, distance to hub, and number of stations on the network.

Upon completion of the auto-negotiation process by the hub 42, the network interface 10 in each station 44 will receive and store network configuration data, described below. Additional details regarding repeaters and auto-negotiation are disclosed in Breyer et al. "Switched and Fast Ethernet: How It Works and How to Use It", Ziff-Davis Press, Emeryville, Calif. (1995), pp. 60–70, and Johnson, "Fast Ethernet: Dawn of a New Network", Prentice-Hall, Inc. (1996), pp. 158–175, the disclosures of which are incorporated in their entirety by reference.

The network of FIG. 2 may also be implemented as a full-duplex network, where the hub 46 is implemented as a switch instead of a repeater. Full-duplex is defined as the capability of a network element 44 and 46 to simultaneously transmit and receive data packets on the corresponding media 50. Hence, CSMA/CD functions are disabled in a full-duplex network, such that controllers do not use carrier sense to defer to passing traffic, and do not use collision detect to abort, backoff, or retry transmissions.

An example of full-duplex communication in the network 42 of FIG. 2 involves point-to-point transmission between stations A and B via the hub 46. The hub 46 itself includes full-duplex capabilities, enabling stations A and B to each simultaneously transmit and receive data. In addition, stations A and B may simultaneously send data to station E, which simultaneously sends acknowledgement messages to stations A and B. Hence, full-duplex communication occurs between station A and the hub 46, station B and the hub 46, and station E and the hub 46. Alternatively, full duplex operation is also possible in the special case of two stations with no hub.

According to the current IEEE 802.3x Revision 1.0 Full-Duplex Draft, stations 44 and the hub 46 are able to send a MAC control frame. Only one MAC control frame is currently specified by IEEE 802.3x[2], namely the PAUSE frame. The MAC control frame enables communications between the respective MAC controllers 22, for example, handshaking, signaling, etc. Hence, if station B detects an overload condition, described below, the MAC 22 of the station B outputs a pause frame to the MAC 22 of station A, requesting the station A to pause for a specified number of slot times. Similarly, if the hub 46 detects an overload condition in its internal buffers due to packet transmissions from one of the stations 44, the hub can output a pause frame for a specified number of slot times to the one station. A slot time ($t_S$) is defined as 512 bit times for 10 MBit/s and 100 MBit/s networks. The slot time ($t_S$) has a preferred value of 4096 bit times for 1000 MBits/s networks, although other values may be used consistent with network topology and propagation characteristics.

According to the present invention, each network element monitors its internal receive buffer to determine the number of stored data bytes. For example, each network station 44 monitors its internal MAC receive FIFO buffer 30b to determine the current number of stored data bytes. If the number of stored data bytes exceeds a certain threshold indicating that overflow of the receive FIFO buffer 30b will soon occur, for example within 5–10 slot times ($t_S$), the MAC pause controller 38 of the corresponding network station instructs the MAC 22 to initiate a flow control interval having a specified wait time ($t_W$). Each network station stores at least one threshold value and a time value specifying the duration of the wait time ($t_W$). The threshold levels and the wait time ($t_W$) may be programmed into a non-volatile memory in the network interface 10, or may be remotely programmed by the hub 46, a server, or a network administrator (i.e., some management entity).

Figure 3:
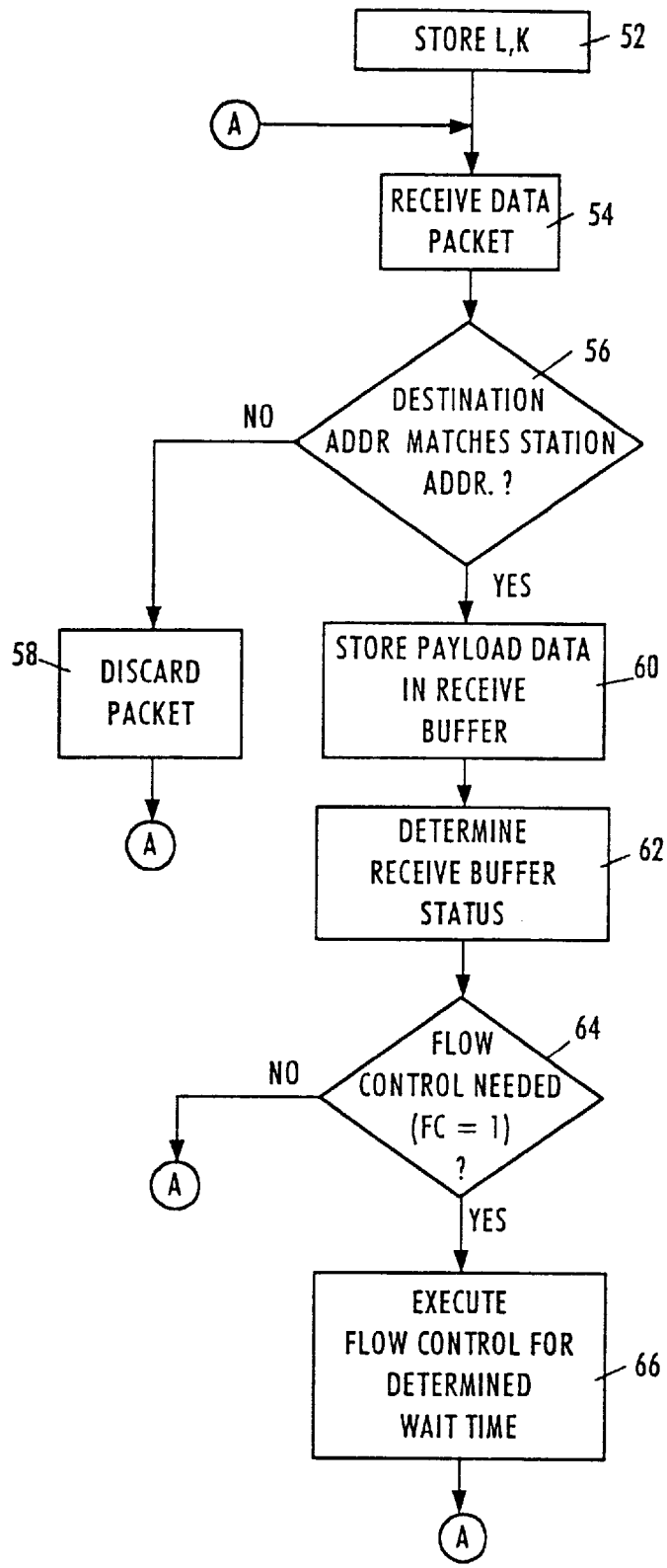
FIG. 3 is a flow diagram illustrating a method of controlling transmission of data packet according to an embodiment of the present invention.

FIG. 3 is a flow diagram illustrating the method of controlling transmission of data packets according to an embodiment of the present invention. Each network station 10 independently executes the disclosed method to prevent overflow of its corresponding MAC receive FIFO buffer 30b. The method begins in step 52 by storing threshold data (L) and wait time coefficients (k) in the wait time registers 40. The wait time registers 40 shown in FIG. 7 may include a plurality of buffer thresholds ($L_1$–$L_n$) and respective wait time coefficients ($k_1$–$k_n$). As described above with respect to FIG. 2, the buffer thresholds ($L_i$) and the respective wait time coefficients ($k_i$) may be received from a network manager via the media 50.

The MAC 22 then monitors the media 50 for activity, and detects the presence of a data packet in step 54. The MAC 22 reads the header information of the received data packet, and checks in step 56 if the destination address of the received data packet matches the station address. If the destination address does not match the station address, the packet is discarded in step 58. If the destination address of the received data packet matches the station address, the MAC 22 in step 60 recovers the payload data from the received data packet, and stores the data bytes of the recovered payload data in the MAC receive FIFO buffer 30b and notifies the MAC pause controller 38 of the stored data bytes.

The MAC pause controller 38 then checks in step 62 to determine the status of the MAC receive FIFO buffer 30b. The MAC pause controller 38 determines in step 64 whether flow control is needed, described in detail below, and initiates flow control by setting a flag (FC=1). If the MAC pause control determines that the status of the MAC receive FIFO buffer 30b does not require initiation of flow control, then the process returns to step 54 for reception of another data packet without interruption. However, if the MAC pause controller 38 determines in step 64 that the status of the MAC receive FIFO buffer 30b requires that flow control be initiated, the MAC pause controller 38 instructs the MAC 22 in step 66 to execute flow control for a determined wait time ($t_W$) determined by the MAC pause controller 38.

Figure 4A:
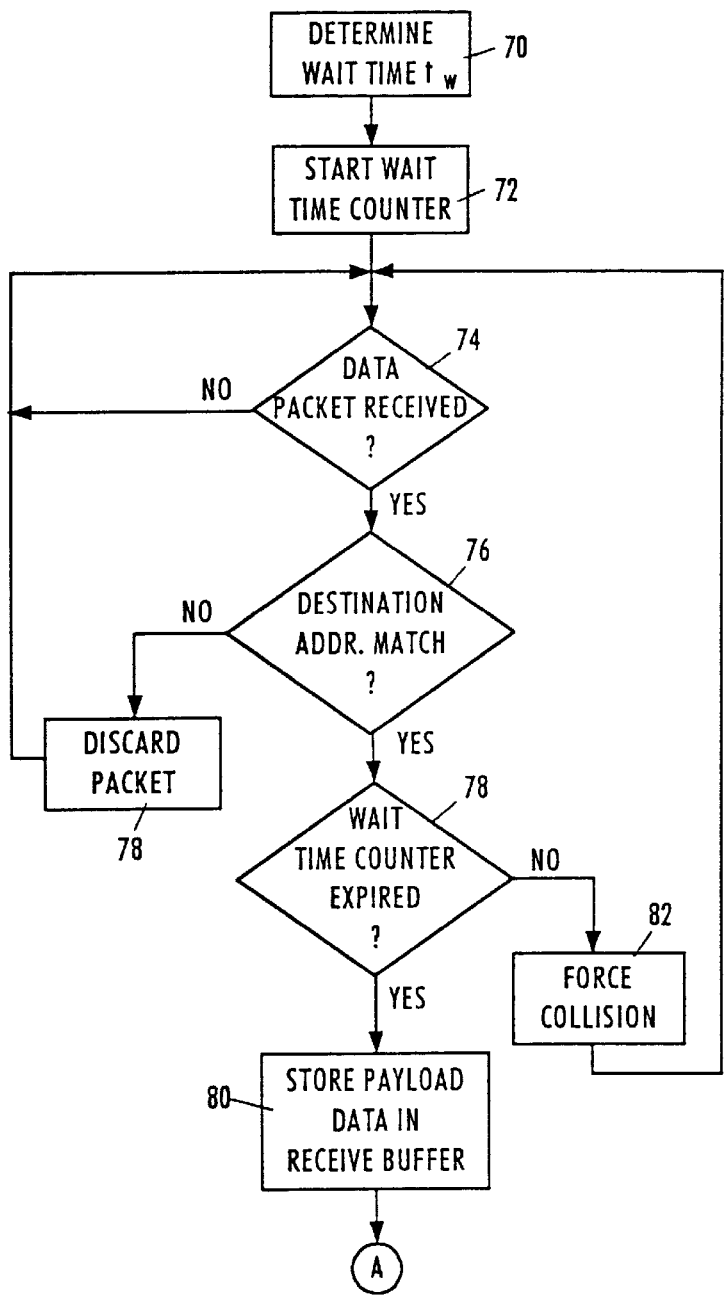
FIGS. 4A and 4B are flow diagrams illustrating flow control in half duplex and full duplex networks, respectively.
Figure 4B:
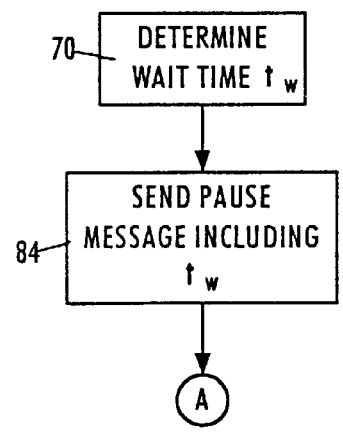

FIGS. 4A and 4B are flow diagrams illustrating implementation of flow control in half-duplex and full-duplex networks, respectively. Execution of flow control in FIG. 4A begins by determining the calculated wait time ($t_W$) in step 70. The wait time ($t_W$) can also be calculated during the determination whether flow control is needed in steps 62 and 64, described below. The MAC pause controller 38 instructs the MAC 22 to begin flow control by starting the wait time counter to count the specified wait time ($t_W$) in step 72. The wait time counter may be implemented by using a programmable collision counter, normally used during collision mediation using the conventional truncated binary exponential backoff (TBEB) algorithm.

After the wait time counter has been started in step 72, the MAC 22 determines in step 74 whether a data packet is received from the media 50. If a data packet is received, the MAC 22 checks in step 76 whether the received data packet has a destination address that matches the station address in step 76. If the destination address of the received data packet does not match the station address, the data packet is discarded in step 78. However, if the destination address matches the station address, the MAC 22 checks whether the wait time counter has expired in step 78. If the wait time counter has expired, the MAC 22 stores the data bytes carried as payload data in the received data packet into the MAC receive FIFO buffer 30b in step 80. However, if the wait time counter has not expired, indicating the flow control mode is still in effect during the wait time interval, then the MAC 22 forces a collision on the network media 50 in step 82. The collision causes the transmitting station to halt the transmission, defer for a random number of slot time intervals according to the TBEB algorithm, and attempt retransmission after a collision backoff interval.

The number of collisions forced by the MAC 22 in step 82 depends upon the number of data packets received by the network station and the duration of the wait time ($t_W$). Hence, if four data packets are received during the wait time interval, then the MAC 22 will force four collisions for the respective received data packets. Hence, the MAC 22 outputs onto the media 50 a flow control signal, implemented as a collision signal, corresponding to the wait time ($t_W$).

FIG. 4B is a flow diagram illustrating the execution of flow control for a full-duplex network, where the MAC 22 outputs a flow control signal corresponding to the wait time $t_W$. As shown on FIG. 4B, after the wait time is determined in step 70, the MAC 22 sends a PAUSE frame including the determined wait time ($t_W$). The protocol for the PAUSE frame is further described in the working proposal of IEEE 802.3x[2].

Figure 5A:
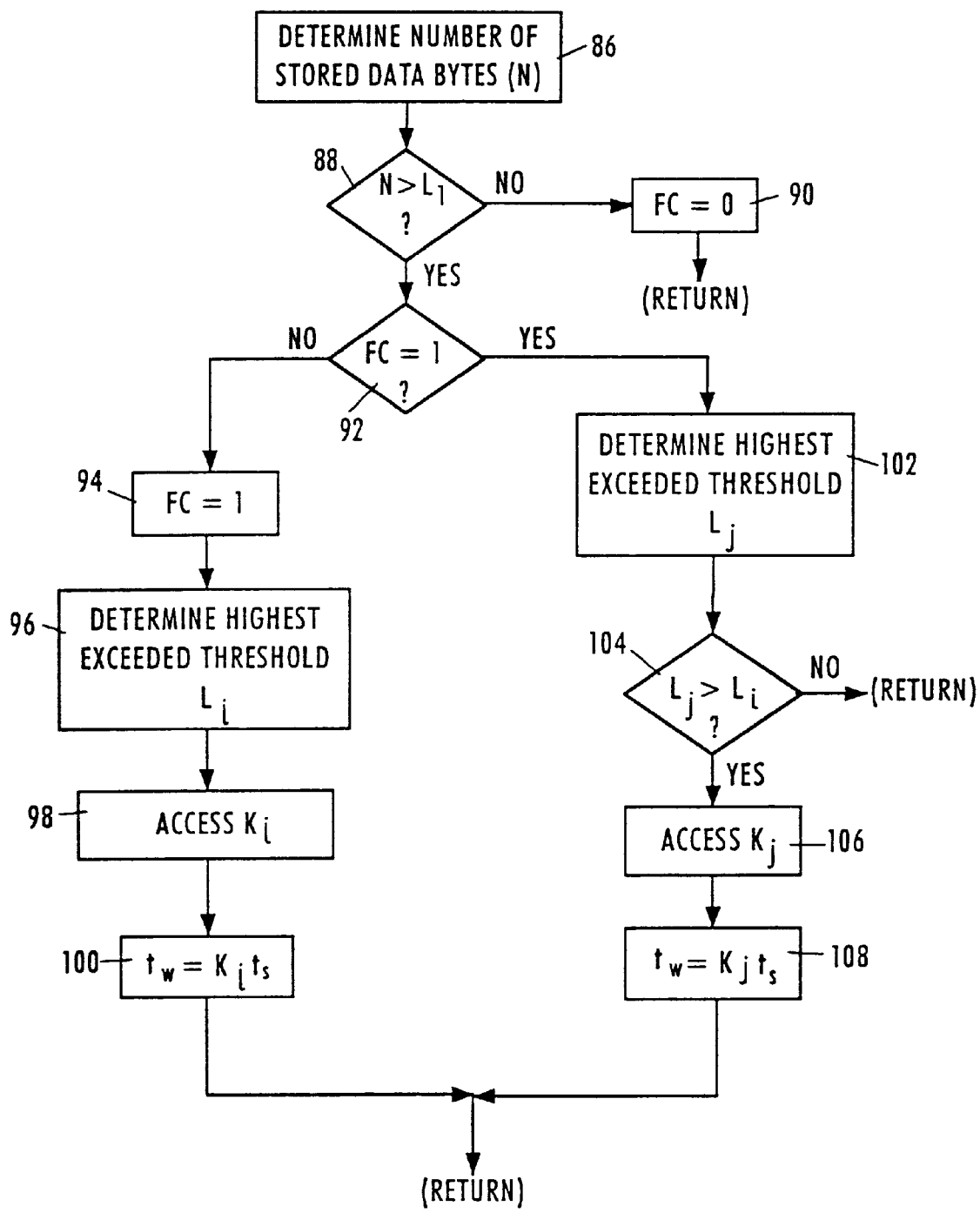

FIGS. 5A, 5B and 5C are flow diagrams illustrating in detail steps 62 and 64 of FIG. 3 determining the receive buffer status, determining whether flow control is needed, and calculating an appropriate wait time ($t_W$) for the flow control mode. Although the disclosed arrangements provide alternative techniques for initiating flow control, each of the variations include the basic functions of determining whether flow control is necessary, and selecting the wait time in response to the monitored number of data bytes stored in the receive buffer.

As shown in FIG. 5A, the MAC pause controller 38 begins in step 86 by determining the number of data bytes (N) stored in the MAC receive FIFO buffer 30b. The MAC pause controller 38 then checks in step 88 whether the number of stored data bytes (N) is greater than a minimum buffer threshold ($L_1$). If the number of stored data bytes (N) is not greater than the minimum threshold ($L_1$), then the MAC pause controller 38 determines no flow control is necessary, sets an internal flow control flag to zero (FC=0) in step 90, and returns to step 54 of FIG. 3.

If the MAC pause controller 38 determines in step 88 that the number of stored data bytes (N) exceeds the minimum threshold ($L_1$), the MAC pause controller 38 checks in step 92 whether the station 10 is already in a flow control mode by checking if the internal flag is already set. If the internal flag (FC) is not set, the MAC pause controller 38 sets the flag in step 94, and determines in step 96 the highest exceeded threshold ($L_i$).

Figure 6A:
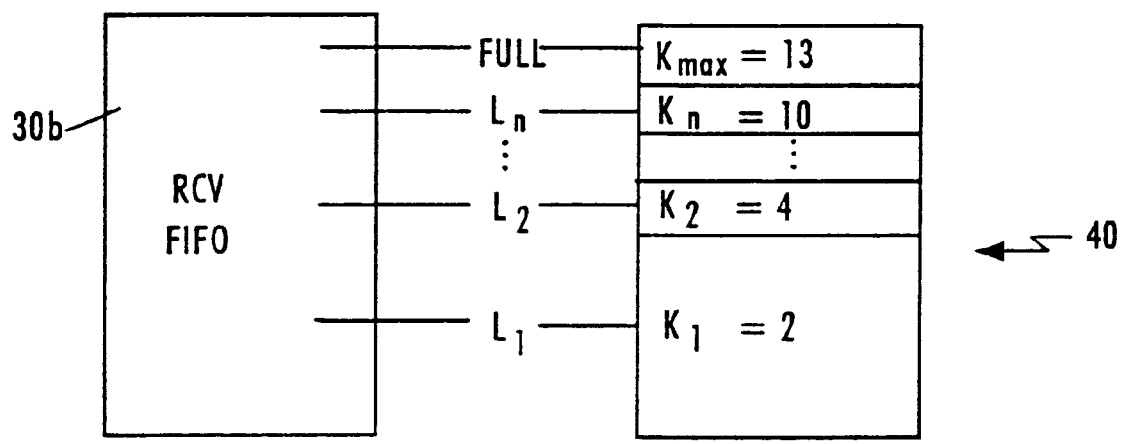
FIGS. 6A and 6B are diagrams illustrating the methods of FIGS. 5A and 5B for calculating a flow control time interval, respectively.

FIG. 6A is a diagram illustrating the relative position of buffer thresholds (L1, L2, . . . , $L_n$) corresponding to predetermined levels of data stored in the receive FIFO buffer 30b. As shown in FIG. 6A, if the number of data bytes in the receive FIFO buffer 30b is greater than the threshold L1, then a first wait time coefficient ($k_1$) is selected from wait time register 40. However, if the number of data bytes stored in the receive FIFO buffer 30b exceeds the second threshold ($L_2$), then the MAC pause controller 38 selects the corresponding second wait time coefficient ($k_2$).

Hence, the MAC pause controller 38 determines in step 96 the highest exceed threshold ($L_i$) as shown on FIG. 6A, and accesses in step 98 the corresponding coefficient ($k_i$). The access wait time coefficient ($k_i$) is used to calculate the wait time as an integer multiple of slot times ($t_S$) in step 100. After calculating the wait time in step 100, the MAC pause controller 38 returns the calculated wait time ($t_W$) to the MAC 22 in step 66, which uses the determined wait time to execute the flow control for either half-duplex mode or full-duplex mode.

As shown in step 62 of FIG. 3 and more specifically in step 86 of FIG. 5A, the MAC pause controller 38 repeatedly checks the number of stored data bytes. For example, a transmitting station may continue to transmit data packets to the receiving station after the receiving station has sent a flow control message due to propagation delay between the two stations. Hence, if in step 92 of FIG. 5A, the flow control flag is already set, the MAC pause controller 38 determines in step 102 the highest exceeded threshold ($L_j$). The MAC pause controller 38 then checks in step 104 if the newly-exceeded second threshold ($L_j$) is greater than the first threshold ($L_i$) in step 104. If the MAC pause controller 38 determines that the number of stored data bytes (N) is greater than the first and second thresholds (i.e., $L_j > L_i$), the MAC pause controller 38 accesses the corresponding wait time coefficient ($k_j$) in step 106 and recalculates the wait time ($t_W$) in step 108. Hence, the method of FIG. 5A enables the wait time ($t_W$) defining the flow control interval to be reset to a greater value, providing the MAC receive FIFO buffer 30b additional time to empty the stored data bytes. Conversely, the MAC pause controller 38 may reduce the wait time ($t_W$) if the MAC receive FIFO buffer 30b has had a sufficient number of data bytes removed.

Hence, FIGS. 5A and 6A illustrate a relatively simple arrangement where flow control is initiated based upon predetermined threshold levels in the MAC receive FIFO buffer 30b. If the number of data bytes continues to exceed successive thresholds, the wait time can be adjusted accordingly to provide additional time for the MAC receive FIFO buffer 30b to be emptied.

FIGS. 5B and 5C disclose alternative arrangements that monitor the removal rate ($r_R$) of data from the MAC receive FIFO buffer 30b. If the data received by the network station exceeds the removal rate capacity of the MAC receive FIFO buffer 30b, the MAC pause controller 38 initiates flow control. The rate of emptying the receive buffers is determined by using continuous monitoring sources or statistical counters.

Figure 6B:
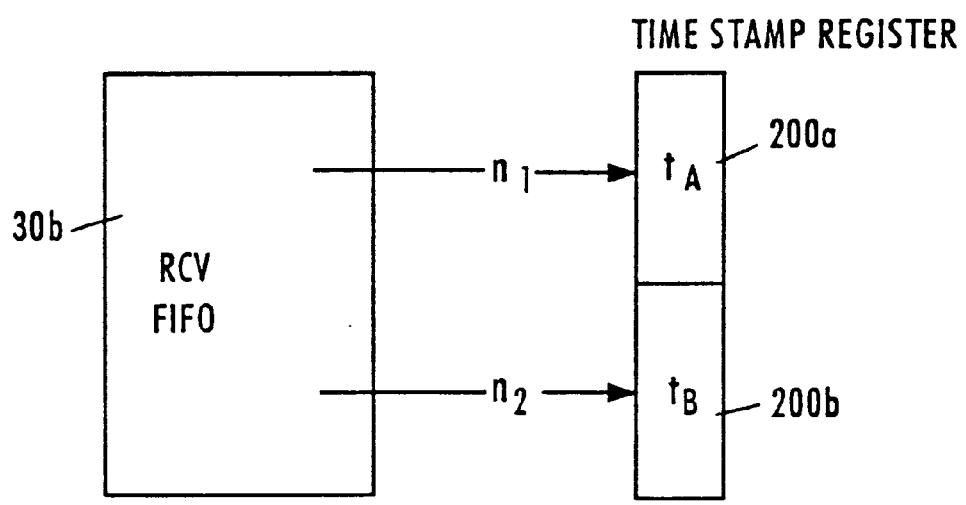

FIG. 5B is a flow diagram illustrating one arrangement for determining when to initiate flow control based upon the rate of emptying the receive buffer 30b, also referred to as the removal rate ($r_R$). The MAC pause controller 38 begins in step 110 by calculating the data removal rate ($r_R$) in accordance with time stamp values recorded with respect to respective thresholds. FIG. 6B illustrates the use of counters to determine the data removal rate ($r_R$). Specifically, the number of stored data bytes (N) is monitored and a time stamp value ($t_a$) is recorded in a time stamp register 200a when the number of stored data bytes reaches the first predetermined threshold ($N=n_1$). A second time stamp value ($t_b$) is recorded in time stamp register 200b sometime after the recording of the first time value in register 200a, i.e., when the number of data bytes have been removed from the MAC receive FIFO buffer 30b to a level corresponding to the second threshold ($N=n_2$).

Hence, the MAC pause controller 38 in step 110 of FIG. 5B determines the removal rate ($r_R$) based upon the relative difference between the threshold values ($n_1-n_2$) and the difference in time stamp values ($t_b-t_a$). The determined removal rate ($r_R$) is then stored in step 112 by the MAC pause controller 38 for future reference.

The MAC pause controller 38 then continually monitors the MAC receive FIFO buffer 30b to determine the number of stored data bytes (N) in step 114. A transmitting station will pause in between uninterrupted consecutive transmissions by a minimum interpacket gap (IPG), defined as 96 bit times for 10 Mb/s, 100 Mb/s, and 1000 Mb/s networks. Hence, the MAC pause controller 38 checks in step 116 if the stored number of data bytes (N) is greater than the number of data bytes that would be removed from the MAC receive FIFO buffer 30b in one time slot interval ($r_R$(IPG)).

If in step 116 the stored number of data bytes does not exceed the threshold based on the removal rate, the MAC pause controller 38 sets the flag to zero in step 118, indicating flow control is not necessary. However, if in step 116 the number of stored data bytes exceeds the threshold, the MAC pause controller 38 sets the FC flag in step 120, and calculates the wait time ($t_W$) as greater than or equal to the amount of time necessary to remove the number of data bytes ($N/r_R$) in step 122.

Hence, the MAC pause controller 38 monitors the rate at which the MAC receive FIFO buffer 30b is emptied, hence enabling the network station 10 to adaptively adjust the thresholds and wait times as necessary. Moreover, the adaptive calculation of the threshold point and the wait times enables the size of the MAC receive buffer 30b to be reduced. Hence, since FIFO buffer sizes range from 256 bytes to 8 K bytes, the size of the buffer may be reduced, for example to 1 K byte.

FIG. 5C illustrates another arrangement for determining whether flow control is necessary, and for calculating the wait time ($t_W$). According to the arrangement disclosed in FIG. 5C, the removal rate ($r_R$) of the MAC receive FIFO buffer 30b is compared with the input storage rate ($r_S$) to determine whether the input storage rate substantially exceeds the removal rate. The MAC pause controller 38 begins in step 130 by determining the number of bytes in the payload ($P_N$) of a received data packet. Hence, the MAC pause controller 38 keeps track of the distribution of payload data sizes by monitoring the history of the data activity over the network. The payload size ($P_N$) corresponds to the number of bytes in the payload of at least one received data packet.

The MAC pause controller 38 then calculates in step 132 a storage rate ($r_S$) as a function of the payload sizes. As recognized in the art, the MAC pause controller 38 calculates the storage rate based upon payload sizes, network data rates, network traffic, etc. based upon statistical analysis. The MAC pause controller 38 then determines the dynamic variables of the PCI bus 12 based upon PCI bus latency characteristics and PCI burst size data in step 134, supplied by the PCI bus interface unit 16. Both the PCI burst size and the PCI bus latency will be variable. After obtaining the dynamic information related to the PCI bus in step 134, the MAC pause controller 38 determines the removal rate ($r_R$) in step 136 based upon the PCI bus information, including the latency and burst size.

After calculating the storage and removal rates, the MAC pause controller 38 determines in step 138 if the storage rate exceeds the removal rate by a predetermined amount (A) corresponding to the number of data bytes stored in the MAC receive FIFO 30b within a given time interval. If the MAC pause controller 38 determines that the storage rate does not exceed the removal rate by the predetermined amount, the MAC pause controller 38 sets the flow control flag in step 140 to zero. However, if the storage rate substantially exceeds the removal rate, then the MAC pause controller 38 calculates the wait time ($t_W$) as a function of the difference between the storage rate and the removal rate in step 142, and sets the flow control flag to one in step 144.

Figure 7:
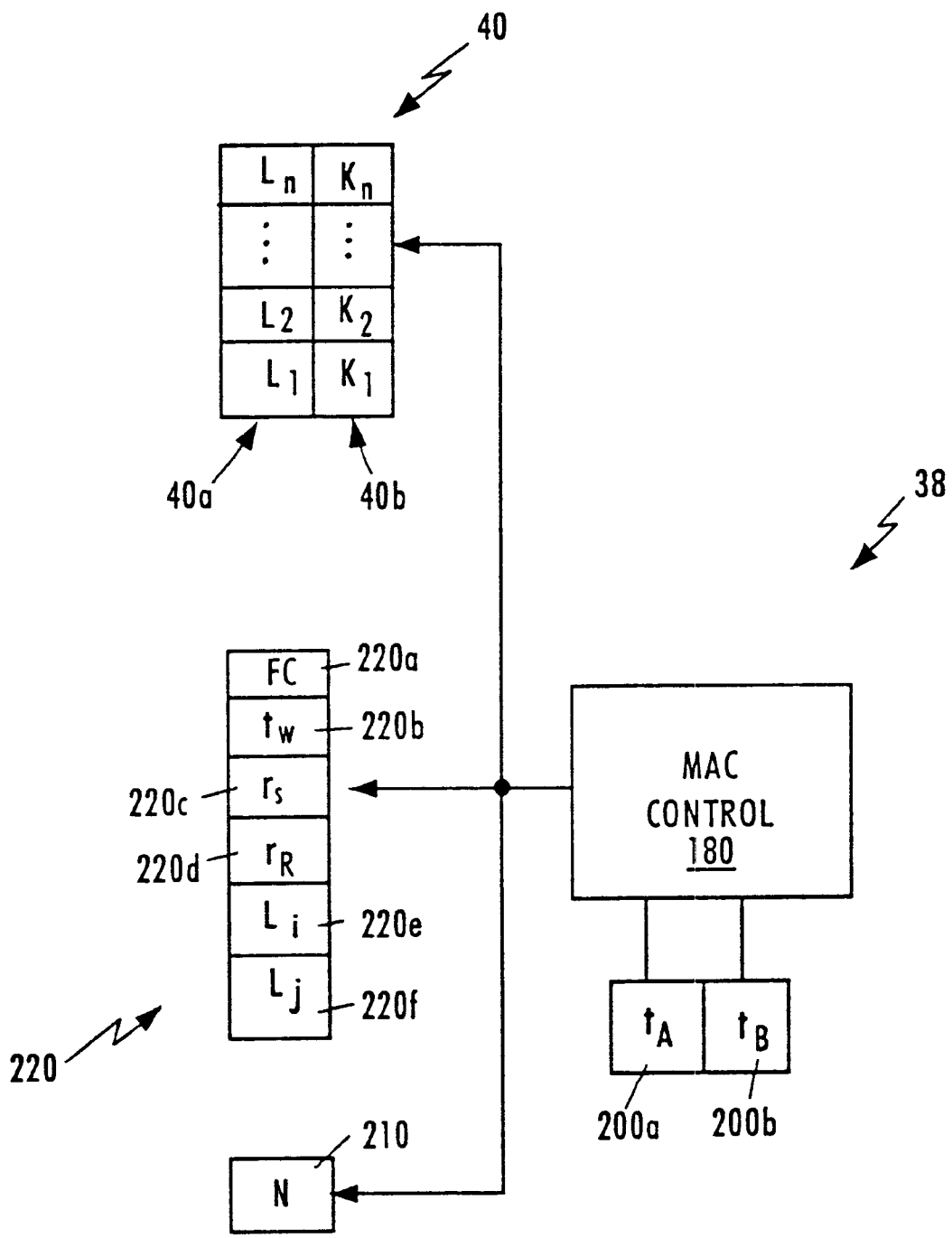
FIG. 7 is a block diagram of the media access control (MAC) of FIG. 1.

FIG. 7 is a block diagram of the MAC pause controller 38. The controller 38 includes a control portion 180 that determines whether to initiate flow control and calculates the wait time. The controller 38 also includes counters 200 that count the time interval for the number of the stored data bytes to change from the first threshold ($n_1$) to the second threshold ($n_2$), shown in FIG. 6B. Alternately, the time interval can be determined using a single programmable timer.

The controller 38 also includes a counter 210 that tracks the number of data bytes (N) stored in the MAC receive FIFO buffer 30b. Register 220a stores the flow control flag, and counter 220b counts the calculated wait time ($t_W$). In addition, registers 220c and 220d store the storage and removal rates, respectively, calculated in FIG. 5C, and registers 220e and 220f store the maximum exceeded threshold value as determined in FIG. 5A.

Although the disclosed embodiments have been described in connection with the monitoring of stored data bytes in network stations of recovered payload data, it will be appreciated that the disclosed arrangements can be implemented in other network elements. For example, the hub 46 may include internal buffers storing data packets received from a transmitting station before output to a destination station. The hub 46 may monitor the number of stored data bytes in its internal buffer and selectively output a flow control signal, where the number of stored data bytes corresponds to the number of data packets and the size (i.e., the byte size) of each packet.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method for controlling transmission of data packets to a network element via a network having a shared medium, comprising:

storing into a receive buffer data bytes of a data packet received from the shared medium by the network element;

monitoring a number of the stored data bytes in the receive buffer; and outputting from a media access controller in the network element onto the shared medium a flow control signal corresponding to a wait time selected in accordance with the number of stored data bytes.

2. The method of claim 1, wherein:

the monitoring step comprises detecting if the number of stored data bytes exceeds a first threshold; and the outputting step comprises initiating said wait time for a first interval in response to the number exceeding said first threshold.

3. The method of claim 2, wherein:

the monitoring step further comprises detecting if the number of stored data bytes exceeds a second threshold greater than said first threshold; and the outputting step further comprises resetting said wait time to a second interval greater than said first interval in response to the number exceeding said second threshold.

4. The method of claim 3, wherein the outputting step further comprises generating at least one collision signal on the shared medium in response to reception of each data packet for the network element during said wait time.

5. The method of claim 3, wherein the outputting step further comprises sending as said flow control signal a pause message specifying said wait time.

6. The method of claim 3, further comprising storing the first and second thresholds and the respective first and second intervals in a memory in said network element.

7. The method of claim 6, wherein the storing step comprises receiving the first and second thresholds and the respective first and second intervals from a network manager via the shared medium.

8. The method of claim 3, wherein said first and second intervals correspond to respective integer multiples of slot times.

9. The method of claim 1, wherein the monitoring step comprises comparing the number of stored data bytes to a plurality of threshold levels and identifying a highest exceeded threshold level.

10. The method of claim 9, wherein the outputting step comprises setting the wait time to one of a plurality of slot time delay intervals corresponding to the identified highest exceeded threshold level.

11. The method of claim 1, wherein the monitoring step comprises:

determining a data removal rate for the receive buffer; and detecting if the number of stored data bytes reaches a first predetermined threshold.

12. The method of claim 11, wherein the outputting step comprises initiating said wait time in response to the detected number of stored data bytes exceeding the first predetermined threshold.

13. The method of claim 12, wherein the outputting step further comprises calculating said wait time in accordance with the data removal rate and the number of stored data bytes.

14. The method of claim 13, wherein the calculated slot time corresponds to an integer multiple of slot times.

15. The method of claim 11, wherein the determining step comprises:

determining a bus latency and a burst size for a network element bus receiving the stored data bytes from the receive buffer; and calculating the data removal rate in accordance with the determined bus latency and burst size.

16. The method of claim 11, wherein the determining step comprises:

recording a first time value when the number of stored data bytes reaches the first predetermined threshold;

recording a second time value after the first time value when the number of stored data bytes reaches a second predetermined threshold less than the first predetermined threshold; and calculating said data removal rate in accordance with the first and second time values and the first and second thresholds.

17. The method of claim 11, wherein the outputting step comprises calculating the wait time in accordance with the data removal rate.

18. The method of claim 11, wherein the monitoring step further comprises:

determining a distribution of payload sizes from data packets transmitted on the shared medium;

calculating a data storage rate for the receive buffer in accordance with the determined distribution of payload sizes; and determining a wait time in accordance with a determined difference between the data storage rate and the data removal rate.

19. A network element receiving data packets from a shared network medium, the network element comprising:

a receive buffer for storing data bytes from the data packets received from the shared network medium;

a buffer monitor for determining a number of stored data bytes in the receive buffer; and a media access controller configured for initiating a wait time interval corresponding to the number of stored data bytes, the media access controller selectively outputting onto the shared network medium a flow control signal during said wait time interval to prevent overflow of the receive buffer.

20. The network element of claim 19, wherein the monitor comprises at least one counter counting a time interval for the number of the stored data bytes to change from a first threshold to a second threshold, the network element further comprising a media access control (MAC) pause controller for calculating said wait time interval in accordance with the counted time interval.

21. The network element of claim 20, wherein the MAC pause controller comprises first and second registers storing the first and second thresholds, respectively.

22. The network element of claim 19, wherein the MAC pause controller comprises a register storing at least one predetermined threshold value, the media access controller initiating the wait time interval in response to the number of stored data bytes exceeding the at least one predetermined threshold value.

23. The network element of claim 19, wherein the MAC pause controller includes an output rate calculator determining an output rate of the stored data bytes from the receive buffer, the MAC pause controller calculating said wait time interval in accordance with the determined output rate.

24. The network element of claim 23, wherein the MAC pause controller includes an input rate calculator determining an input rate of the received data bytes into the receive buffer, the MAC pause controller calculating said wait time interval in accordance with the input rate.

25. The network element of claim 19, wherein the MAC pause controller comprises a wait time counter counting said wait time interval.

26. The network element of claim 21, wherein the media access controller is configured for receiving the first and second thresholds from the shared medium.

27. The network element of claim 19, wherein the media access controller generates at least one collision signal on the network medium in response to reception of a data packet for the network element during said wait time interval.

28. The network element of claim 19, wherein the media access controller outputs a pause frame as a flow control signal specifying said wait time interval.

* * * * *

UNITED STATES PATENT AND TRADEMARK OFFICE
CERTIFICATE OF CORRECTION

PATENT NO. : 5,905,870
DATED : May 18, 1999
INVENTOR(S) : Jim Mangin, et al.

It is certified that error appears in the above-identified patent and that said Letters Patent is hereby corrected as shown below:

Column 3, line 14, change "Figure 1 is a block diagram" to -- Figures 1, 1A and 1B are block diagrams--.

Signed and Sealed this

Twenty-second Day of August, 2000

Attest:

Q. TODD DICKINSON

*Attesting Officer*  *Director of Patents and Trademarks*